United States Patent [19]

Kramer

[11] Patent Number: 4,496,936
[45] Date of Patent: Jan. 29, 1985

[54] DIGITAL-ANALOG CONVERSION FOR SHAFT ENCODERS

[75] Inventor: Dan H. Kramer, Sunnyvale, Calif.

[73] Assignee: Atari, Inc., Sunnyvale, Calif.

[21] Appl. No.: 385,134

[22] Filed: Jun. 4, 1982

[51] Int. Cl.³ .............................................. H03K 13/00
[52] U.S. Cl. ........................... 340/347 P; 250/231 SE; 324/83 R; 324/83 A
[58] Field of Search .............. 340/347 P; 250/231 SE; 324/175, 83 R, 83 A; 364/565; 74/471 XY, 471 R; 307/355; 328/133

[56] References Cited

U.S. PATENT DOCUMENTS

| | | | |
|---|---|---|---|
| 3,304,434 | 2/1967 | Koster | 250/231 SE |
| 3,589,178 | 6/1971 | Germann | 324/83 R |
| 3,777,233 | 12/1973 | Natens | 324/175 |
| 3,963,919 | 6/1976 | Sells | 250/231 SE |
| 4,145,608 | 3/1979 | Shirasaki | 250/231 SE |
| 4,246,497 | 1/1981 | Lawson | 324/83 A |
| 4,308,500 | 12/1981 | Avins | 250/231 SE |

Primary Examiner—Charles D. Miller
Attorney, Agent, or Firm—Townsend and Townsend

[57] ABSTRACT

Apparatus for producing an analog signal—having a relative amplitude that is indicative of the direction and rate of rotation of a shaft—from a pair of pulse streams provided by a shaft encoder coupled to the shaft. The invention includes circuitry for comparing the phase relationship between the signals to determine direction, for generating a digital pulse of a fixed pulse-width for each pulse contained in one of the pulse streams, and integrating the time or inverted form of the digital pulse, depending upon the determined direction, to produce the analog signal.

13 Claims, 3 Drawing Figures

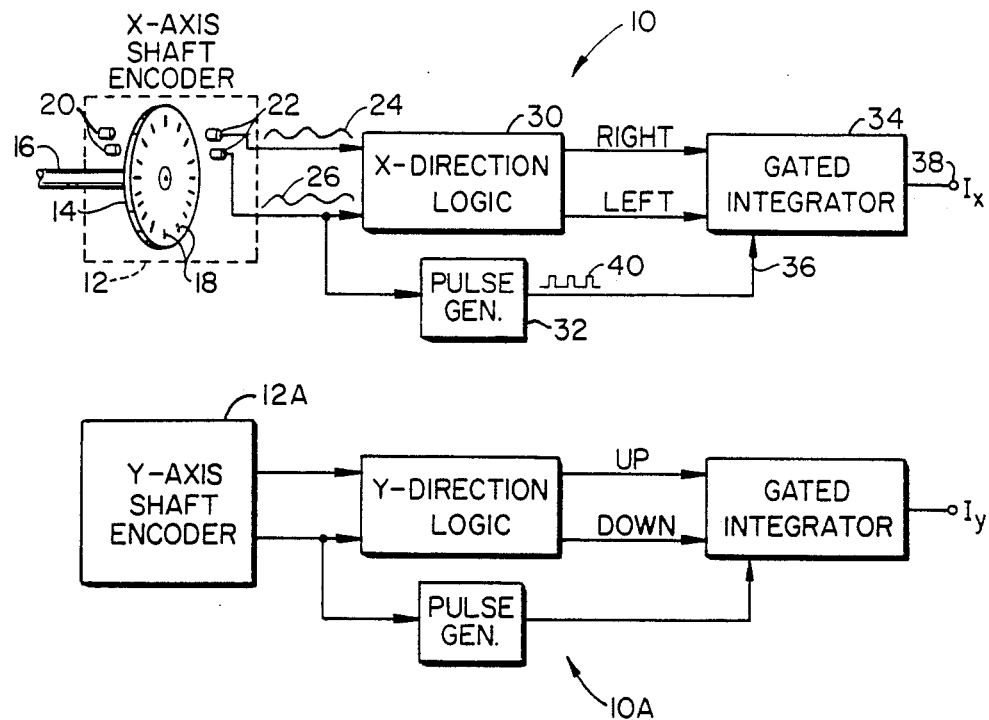
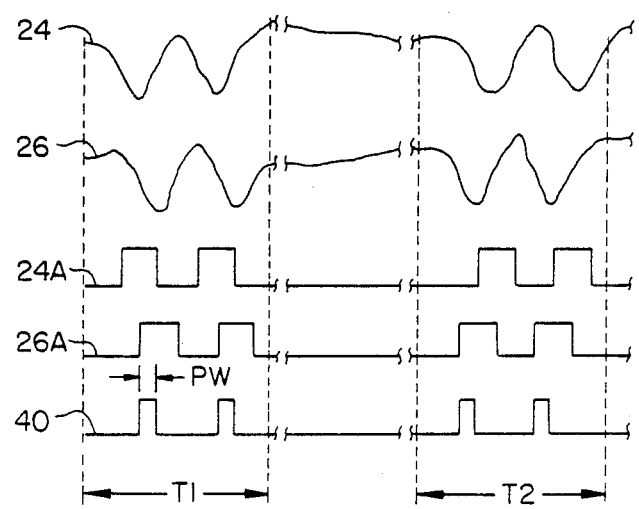
FIG._1.
FIG._3.

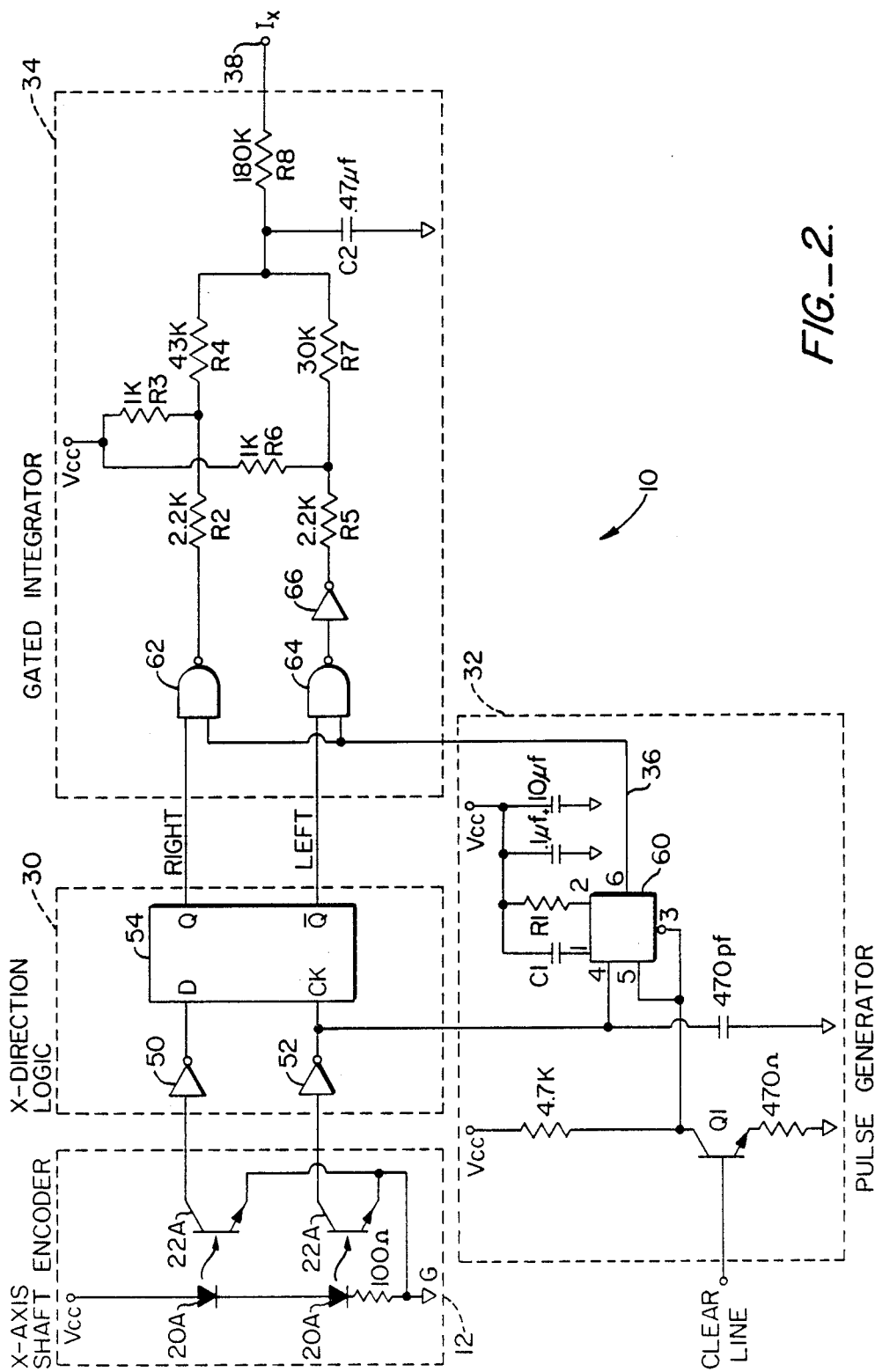
FIG._2.

DIGITAL-ANALOG CONVERSION FOR SHAFT ENCODERS

The present invention is directed to apparatus for converting streams of pulses produced by a shaft encoder in response to rotation of a shaft to an analog signal having an amplitude representing the direction and rate of shaft rotation.

BACKGROUND OF THE INVENTION

Video display systems, including video games, often require some type of manipulative control element to form an electrical signal from which movement of a symbol (or other information change) on a display screen can be effected. One form of such control element is a joy stick having two (2) degrees of freedom (forward-reverse and left-right). Resultant motion of the "stick" will operate to close a switch or control a potentiometer to produce a voltage that is ultimately used to position an object (or produce another change in the display).

Also available is a ball operated mechanism, the ball forming the manipulative element. The ball is operably connected to suitable mechanical structure for providing output signals that can be used to position symbols on a video display screen. In one form of this type of mechanism the ball is supported by a motion transmitting mechanism, including a pair of orthogonally oriented shafts. Universal movement of the ball resolves into rotational movement in one or both of the shafts to produce signals indicative of ball movement. Examples of this type of control element are found in U.S. Pat. Nos. 3,013,441 and 3,395,589.

A shaft encoder of one type or another is coupled to the shafts of this latter type of control element to provide an output indicative of shaft rotation—and, therefore, ball movement. One form of shaft encoder uses a disk attached to an end of a shaft that is apertured to modulate a collimated light beam as the shaft rotates about its longitudinal axes. An example of this type of encoder may be found in U.S. Pat. No. 4,271,364. The modulated light beam is received by an appropriate detector which produces a stream of pulses therefrom. The pulse recurrance frequency (PRF) of the stream is indicative of the rate of rotation of the shaft. In order to resolve direction of rotation of the shaft, two phased detectors are used, each being placed proximate the disk to receive the modulated light beams in a predetermined sequence. The stream of pulses produced by one detector will lead or lag (typically by 90 degrees) the stream of pulses produced by the other detector-depending upon the direction of shaft rotation.

However, using such shaft encoding systems is not without certain problems. For example it is often costly in terms of the interrupts, time, and software required to read directly the pulse stream pairs produced for each shaft. Further, the present invention requires only two pin connections for each control element.

SUMMARY OF THE INVENTION

Accordingly, the present invention provides apparatus for receiving a pair of signals, each in the form of a stream of phase-related pulses, provided by a shaft encoder, and for converting the received signals to an analog output having an amplitude that is indicative of the direction and rate of shaft rotation.

According to the present invention, therefore, this is provided by a comparator device that receives the two pulse stream signals to provide therefrom a binary signal indicative of the direction of shaft rotation, a pulse generator that produces a digital pulse train containing a fixed width pulse for each of the pulses appearing in one of the pulse streams, and a gated integrator that is responsive to both the binary signal and the digital pulse train to integrate the digital pulse train, or an inverted form of the digital pulse train, depending upon the state of the binary signal, producing therefrom an analog output signal indicative of the direction and rate of shaft rotation.

There are a number of advantages obtained by the present invention. First, a video system not having dedicated circuitry or interrupt capability for receiving the pulse streams produced by a shaft encoder of the type described herein can receive, or easily be adapted to receive, the analog output signal produced by the invention to control movement of an object on a video screen such as, for example, a cursor. Also, since the number of pin connections is often limited in electronic circuitry of any type, reduction of the number of pin connections from four (produced by the two X and Y shaft encoders) to two is advantageous.

In addition, since the video system is not required to continuously monitor the pulse streams produced by the shaft encoders, the necessary computing time and the need for software consuming interrupts are eliminated.

These as well as other and further important objects of the present invention will become apparent from the discussion and disclosure contained in the following detailed description of the invention, the accompanying drawings, and the appended claims.

BRIEF DESCRIPTION OF THE DRAWINGS

FIG. 1 is a block diagram illustrating the invention for converting the pulse stream produced by both the X and Y shaft encoders of a ball type control mechanism;

FIG. 2 is a detailed schematic of the invention; and

FIG. 3 are wave forms illustrating operation of the invention.

DETAILED DESCRIPTION OF THE INVENTION

In the preferred embodiment the invention is utilized with the ball-type control mechanism described above, i.e., the type that includes having suitable mechanical structure for resolving the universal motion of the ball into two component output motions (typically referred to as an "X" and "Y" axes). The mechanism typically includes a rotatable shaft for each motion axes, the motion of the shaft being read by a shaft encoder of the type that produces a pair of pulse stream signals indicative of shaft rotation.

Referring to FIG. 1, there is schematically illustrated the converter of the present invention, generally designated with the reference numeral 10, used to convert the pulse stream signal pair produced by X-axes shaft encoder 12 to an analog output signal $I_X$. An identical construction of the converter 10 is found in converter 10A, which is used to convert the pulse stream signal pair produced by the Y-axes shaft encoder 12A to an output voltage $I_Y$. Since the converters 10 and 10A are identically constructed, only a description of the converter 10 will be provided. It should be understood, however, that any such description will apply equally to converter 10A unless otherwise noted.

As schematically illustrated in FIG. 1, the shaft encoder 12 to which the converter 10 is operably coupled is of the type that includes a planar disk 14 coupled to the end of a shaft 16. Formed in the disk 14, and proximate its outer periphery, are a plurality of equally spaced apertures or shutters 18. Located on either side of the disk 14 are a pair of light sources 20 and a pair of detectors 22. Each light source 20 is located and oriented to produce a collimated light beam that is received by an associated detector 22. The light sources 20 and detectors 22 are located, relative to the disk 14, so that the collimated light beams produced by the light sources 22 are modulated by the shutters 18 as the disk 14 is rotated (by rotation of the shaft 16 about its longitudinal axes) and received by the detectors 22 which, in response, produce pulse stream signals 24 and 26.

The converter 10 includes an X-direction logic circuit 30 that receives the two pulse stream signals 24 and 26, a pulse generator 32 that receives only the pulse stream signal 26, and a gated integrator 34 that receives a RIGHT and a LEFT signal line from the X-direction logic 30 and the output signal line 36 from the pulse generator 32.

The detectors 22 are preferably positioned so that, depending upon the direction of rotation of shaft 16 and, therefore, disk 14, the corresponding collimated light beam for one detector will be interrupted or modulated prior to or after the interruption or modulation of the collimated light beam received by the other of the detectors 22 depending on the direction of rotation. Accordingly, when the shaft 16 rotates, the pulses contained in the pulse stream signal 24 will lead (or lag) in phase those contained in pulse stream signal 26 by (preferably) approximately 90 degrees. This relative phase relation of the pulses of pulse stream signal 24 with respect to the pulses of pulse stream signal 26 provides information respecting the direction of rotation of shaft 16. Thus, the X-direction logic 30 compares the relative phase relationship between the received pulse stream signals 24, 26, determines a direction of rotation, and produces a binary signal (i.e., a binary ONE or ZERO) on the corresponding output signal line RIGHT or LEFT to designate the determined direction of rotation.

One of the pulse stream signals, here pulse stream signal 26, is also applied to the pulse generator 32 which, in response to each individual pulse contained in the pulse stream signal 26, produces a corresponding fixed pulse width digital pulse; the digital pulses, in turn, forming a digital pulse train 40. The digital pulse train 40 is applied, via the signal line 36, to the gated integrator 34 and, as will more particularly described below, are integrated to produce the analog output signal $I_X$.

Referring now to FIG. 2, the converter 10 and X-axis shaft encoder 12 are illustrated in greater detail. As shown, the shaft encoder 12 includes light emitting diodes 20A as the light sources 20 (FIG. 1), and detector transistors 22A form the detectors 22. The diodes 20A are forward biased by electrically connecting them in series between a voltage source $V_{CC}$ (nominally 5 volts) and a ground G through a 100 ohm current limiting resistor. Not shown, for reasons of clarity, are the necessary pull-up resistors that would be used on the collector leads of the detector transistors 22A.

Typically, the pulses produced by the detectors of 22A are generally rounded and not particularly suitable for triggering digital circuits reliably. Accordingly, the pulse stream signals 24 and 26 are respectively applied to Schmitt trigger devices 50 and 52 (manufactured by Texas Instruments and sold under the parts number 74LS14) to produce, for each pulse of the pulse train, a square shaped pulse. The Schmitt trigger devices are illustrated in FIG. 2 as being part of the X-direction logic 30, but may also be included in the X-axis shaft encoder 12.

The outputs of the Schmitt trigger devices 50 and 52 are applied to a D-type flip-flop 54, with the (squared) pulse stream signal from the Schmitt trigger device 50 being applied to the data (D) of the flip-flop 59 and the output of the Schmitt trigger device 52 being applied to the clock (CK) input of the flip-flop. The flip-flop 54 is of the type that functions to accept data applied to its D input upon the rising edge of the signal applied to its CK input. This feature of flip-flop 54 is used to determine the phase relationship between the two pulse stream signals 24 and 26 produced by the Schmitt trigger devices 50 and 52. Since the pulse stream signals 24 and 26 are related in phase by plus or minus approximately 90 degrees, the presence or absence of a pulse at the D input of flip-flop 54 upon the appearance of a rising edge of a pulse applied to the CK input will provide an indication of this phase relationship, and therefore, an indication of shaft rotation. Accordingly, depending upon the signal applied to the D input, the Q will become a logic ONE or logic ZERO, as the case may be, correspondingly indicating direction of rotation. The Q output of flip-flop 54 is communicated to the gated integrator 34 by the RIGHT signal line; the complementary output, $\overline{Q}$ of flip-flop 54 is communicated, via the LEFT signal line.

The squared pulse stream signal produced by the Schmitt trigger device 52 is also applied to a retriggerable one-shot 60 of the pulse generator 32. Each received pulse contained in the signal from the Schmitt trigger device 52 will cause the one-shot 60 to produce a digital pulse having a fixed pulse width (PW) on output line 36. The pulse width of the digital pulse, which is approximately 2.5 milliseconds, is set by the timing circuit primarily comprising the resistor R1 and capacitor C1.

The output signal line 36 from the one-shot 60 is applied to one input of each of a pair of two input NAND gates 62 and 64 contained in the gated integrator 34. The other inputs of the NAND gates 62 and 64 respectively receive the RIGHT and LEFT signal lines from the Q and $\overline{Q}$ outputs of the flip-flop 54. The output of the NAND gate 62 will be an inverted version of the pulse train 40 if the Q output of flip-flop 54 is a logic ONE. This output is applied to an integrator circuit comprising (primarily) of resistor R4 and capacitor C2 having the values indicated. Resistors R2 and R3 form, to a limited extent, a part of the integrating network also. However, because of the relative size of resistor R4, it primarily determines the integration time constant. Resistors R2 and R3 function to set the limits for the pulse to be integrated by the resistor R4, capacitor C2 combination. Thus, the (negative-going) pulses applied to resistor R4 will have a nominal 1.5 volt swing.

The output of the NAND gate 64 is inverted by the inverter 66 and then coupled to a integrator circuit comprising the resistor R7 and the capacitor C2. As did resistors R2, R3, resistors R5 and R6 limit the (positive-going) pulses applied to the resistor R7 to nominally vary between 3.55 and 5.0 volts (a 1.5 volt swing).

The network of resistors R2, R3, R4 and R5, R6, R7 function to bias the output analog signal $I_X$ towards an equilibrium value. The output analog signal $I_X$ attains this equilibrium value in a quiescent state when there is no shaft rotation (and, therefore, no pulses being produced by the one-shot 60). The resistor R8 serves to isolate capacitor C2 from attached circuitry and to limit the current drawn from the capacitor.

Referring now to FIGS. 2 and 3, the converter 10 operates as follows: as the shaft 16 rotates, and with it the apertured encoder disk 14 (FIG. 1), the collimated light beams produced by light sources 20 will be modulated to produce the pulse streams 24 and 26 (FIGS. 1 and 3). Assume, as indicated in FIG. 3 during time period T1, shaft rotation causes the pulses of the pulse stream 24 to lead those of pulse stream 26. When applied to the Schmitt trigger devices 50 and 52, the pulse streams 24 and 26 become the squared pulses 24A and 26A, which are applied to the D and CK inputs of the flip-flop 54. Since the signal that is applied to the CK input of flip-flop 54 lags that applied to the D input (as illustrated by the wave forms 24A and 26A during the time T1) the rising edge of the wave form 26A will cause the Q output of the flip-flop to become a logic ONE; and, conversely, the upper case $\overline{Q}$ output will become a logic ZERO.

At the same time, the waveform 26A from the Schmitt trigger device 52 is also applied to the one-shot 60 which, in turn, produces a digital pulse train 40 containing pulses each having a fixed pulse width (PW).

The digital pulse train 40 produced by the one-shot 60 is applied to the NAND gates 62 and 64. The NAND gate 64 is disabled by the logic ZERO produced by the $\overline{Q}$ output of the flip-flop 54. The NAND gate 62 is enabled by the logic ONE produced by the Q output of the flip-flop 54. The digital pulse train 40 produced by the one-shot 60 is inverted (by the NAND gate) and coupled to the integrator circuit of resistor R4 and capacitor C2. The negative-going pulses from NAND gate 60 will cause the voltage at the terminal 38 to decrease from the reference value by an amount indicative of the PRF of the pulse train 40. The direction of change is, it can be seen, indicative of one particular direction of shaft rotation. The relative large size of the capacitor C2 (0.47 micro-farads) will filter any abrupt changes, so that the transistion from the reference value will be smooth.

Alternatively, as illustrated in FIG. 3 by the time period T2, if the shaft 16 is rotated in a direction opposite to that indicated by the conditions of time period T1, the pulses of the pulse stream signal 26 will lead those of the pulse stream 24. Accordingly, the squared waveform produced by the Schmitt trigger device 52 will also lead that of the Schmitt trigger device 50. Thus, the Q and $\overline{Q}$ outputs of the flip-flop 54 will reverse state, the Q output assuming a logic ZERO and the $\overline{Q}$ output assuming a logic ONE. The NAND gate 64 is enabled so that the digital pulses produced by the one-shot 60 are passed to the inverter 66 and appear in essentially non-inverted form at the integrator circuit of resistor R7 and the capacitor C2 as positive going pulses, causing the amplitude of analog output $I_X$ appearing at the output terminal 38 to increase. Again, the amount of increase of the analog output signal $I_X$ is determined by the PRF of the digital pulse train 40 and, therefore, is indicative of the rate of shaft rotation. The direction of change of $I_X$ (here, an increase) is, as before, an indication of the direction of shaft rotation that is opposite that caused by the conditions illustrated by time period T1 in FIG. 3.

In the preferred embodiment described, the timing network of the one-shot 60 comprising capacitor C1 and resistor R1 are selected to produce pulses that have a pulse width of approximately 2.5 milliseconds. Accordingly, it should be appreciated that the upper limit of circuit operation is approximately 400 Hertz. The upper limit of operation can be extended by decreasing the pulse width of the digital pulses produced by the one-shot 60. However, this will decrease the resolution at the low end of shaft rotation.

In one embodiment of the present invention resistors R4 and R7 have equal values of 47K ohms. However, at high pulse rates (greater than 200 Hertz) the output was found to be more sensitive to the negative-going pulses from NAND gate 62 relative to the positive-going pulses from inverter 66. In the preferred and illustrated embodiment resistor R4 has a greater resistance than that of resistor R7. This tends to equalize the effect of positive and negative-going pulses on the output at high pulse rates.

A CLEAR LINE is coupled to a clear input (pin 3) and another input (pin 5) of one-shot 60. In normal operation a low voltage is coupled to the CLEAR LINE which allows one-shot 60 to operate as described above. By applying a high voltage to the CLEAR LINE the one-shot 60 is disabled and it does not provide any output pulses. This allows the network of resistors to produce a quiescent equilibrium voltage on capacitor C2 which can be used as a calibration voltage.

While the invention has been particularly taught and described with reference to the preferred embodiment, those versed in the art will appreciate that minor modifications in form and detail may be made without departing from the spirit and scope of the invention. Accordingly, all such modifications are embodied within the scope of this patent as properly coming within my contribution to the art and are particularly pointed out by the following claims.

I claim:

1. In a system including a shaft rotatable about a longitudinal axis in a first and a second direction and a shaft encoder coupled thereto, apparatus for converting a pair of signals produced by the shaft encoder to an analog signal that is indicative of the direction and a rate of rotation of the shaft, each one of the signals comprising a stream of pulses, the pulses of a one of the pair of the signals being shifted in phase relative to the pulses of the other of the pair of signals to indicate direction of rotation, the apparatus comprising:
   comparing means adapted to receive said signals and being responsive thereto for providing a binary signal indicative of the direction of rotation;
   pulse means adapted to receive the one of the pair of signals for providing therefrom a pulse train comprising a plurality of digital pulses of a fixed pulse width, one digital pulse corresponding to each of the pulses contained in the one signal; and
   circuit means responsive to the binary signal and the digital pulse train for integrating the pulse train in response to the first direction of rotation of the shaft and for inverting and integrating the inverted form of the pulse train in response to a second direction of rotation of the shaft, the circuit means including means for forming the analog signal from the integration of the pulse train.

2. The apparatus of claim 1, wherein the comparing means includes a bistable circuit having a clock input for receiving the one of the pair of signals and a data input for receiving the other of the pair of signals.

3. The apparatus of claim 1, including wave shaping means adapted to be interposed between the shaft encoder and the comparing means and pulse means for receiving said pair of signals and for producing therefrom digital waveforms corresponding to each of the pair of signals, the wave shaping means being coupled to the comparing means for communicating the digital waveforms thereto.

4. The apparatus of claim 1, the circuit means including gate means coupled to receive the binary signal and the pulse train to produce therefrom the pulse train or the inverted form of the pulse train in response to presence or absence of the binary signal, respectively.

5. The apparatus of claim 1, the circuit means including means for causing the analog signal to assume a predetermined value indicative of the absence of shaft rotation.

6. The apparatus of claim 1, wherein the circuit means further includes means for biasing the analog signal towards a quiescent value, the analog signal having an amplitude responsive to the rate and direction of the shaft rotation.

7. The apparatus of claim 6, wherein the circuit means further includes a first and a second resistor each coupled to an integrating capacitor, the first resistor coupled to couple the inverted form of the pulse train to the capacitor, the second resistor coupled to couple the pulse train to the capacitor, the first resistor having a larger resistance than that of the second resistor.

8. The apparatus of claim 7, further including an output terminal means for isolating the analog signal from and coupling the analog signal to the output terminal.

9. Apparatus for converting a stream of pulses produced by a shaft encoder comprising:
a rotatable shaft;
first pulse generation means for producing a first pulse train in response to rotation of said rotatable shaft;
second pulse generation means for producing a second pulse train in response to rotation of said rotatable shaft;
comparing means adapted to receive said first pulse train and said second pulse train and providing therefrom a binary response indicative of the direction of rotation of said rotatable shaft;
third pulse generation means for producing a third pulse train, the frequency of said third pulse train being a function of the rotation frequency of said rotatable shaft; and
circuit means responsive to said third pulse train for integrating said third pulse train in response to a first direction of rotation of said rotatable shaft and integrating an inverted form of said third pulse train in response to a second direction of rotation of said rotatable shaft opposite said first direction, to produce an analog signal, said circuit means including a first nand gate, the inputs of said first nand gate consisting of said third pulse train and said binary response, a second nand gate, the inputs of said second nand gate consisting of said third pulse train and a signal in a state opposite that of said binary response, an inverter whose input consists of the output of said second nand gate, and an integration means for integrating the output of said first nand gate and said inverter.

10. The apparatus in claim 9 wherein comprising means comprises a flip-flop.

11. The circuit in claim 9 wherein said circuit means comprises a resistor-capacitor network.

12. The circuit in claim 11 wherein said resistor-capacitor network comprises a first resistor between said inverter and a first node;
a first pullup resistor between a power source and said first node;
a second resistor between said first node and a second node;
a third resistor between said second node and an output terminal;
a capacitor between said second node and a ground node;
a fourth resistor between the output of said first nand gate and a third node;
a second pullup resistor between a power source and said third node; and
a resistor between said third node and said second node.

13. The circuit in claim 12 wherein said third pulse generating means comprises a one-shot.

* * * * *